(12) United States Patent
Ormiston

(10) Patent No.: US 11,182,655 B2
(45) Date of Patent: Nov. 23, 2021

(54) METALLIC TRANSACTION CARDS

(71) Applicant: ANOMATIC CORPORATION, Newark, OH (US)

(72) Inventor: Mark A. Ormiston, Hebron, OH (US)

(73) Assignee: ANOMATIC CORPORATION, Newark, OH (US)

( * ) Notice: Subject to any disclaimer, the term of this patent is extended or adjusted under 35 U.S.C. 154(b) by 0 days.

(21) Appl. No.: 16/712,552

(22) Filed: Dec. 12, 2019

(65) Prior Publication Data
US 2020/0193250 A1 Jun. 18, 2020

Related U.S. Application Data

(60) Provisional application No. 62/778,987, filed on Dec. 13, 2018.

(51) Int. Cl.
*G06K 19/02* (2006.01)
*G06K 19/06* (2006.01)
(Continued)

(52) U.S. Cl.
CPC .............. *G06K 19/02* (2013.01); *B32B 15/20* (2013.01); *G06K 19/06187* (2013.01); *B32B 2425/00* (2013.01); *B42D 25/328* (2014.10)

(58) Field of Classification Search
CPC ........ G06K 19/00; G06K 19/04; G06K 19/06; G06K 19/07722
(Continued)

(56) References Cited

U.S. PATENT DOCUMENTS 3,484,342 A 12/1969 Blake et al.
3,896,726 A 7/1975 Staats
(Continued)

FOREIGN PATENT DOCUMENTS

CN 106462782 A 2/2017
KR 101653702 B1 9/2016

OTHER PUBLICATIONS

International Search Report and Written Opinion, dated Apr. 16, 2020. International Application No. PCT/US19/66040, file date Dec. 12, 2019. Anomatic Corporation, Applicant. Authorized Officer, Lee Young. Forms PCT/ISA/220, PCT/ISA 210, and PCT/ISA/237. 12 pages.

(Continued)

*Primary Examiner* — Edwyn Labaze
(74) *Attorney, Agent, or Firm* — Vorys, Sater, Seymour and Pease LLP; Scott M. Guttman

(57) ABSTRACT

A transaction card includes an anodized card body having a front and rear face. Various information and security features may be provided on the front face and on the rear face. A magnetic stripe may be provided on the rear face of the anodized card body. The magnetic stripe may be adhered within a slot formed within the rear face of the anodized body. Alternatively, the magnetic stripe may be provided via an overlay that is adhered to the rear face of the anodized body, and the magnetic stripe may be integral with the overlay or adhered to the overlay after the overlay is applied to the anodized card body. The transaction card may also include a hologram. The hologram may be integral with the overlay or may be applied to the overlay that has been arranged on the anodized card body.

20 Claims, 4 Drawing Sheets

(51) Int. Cl.
*B32B 15/20* (2006.01)
*B42D 25/328* (2014.01)

(58) Field of Classification Search
USPC .................................. 235/488, 375, 380, 487
See application file for complete search history.

(56) References Cited

U.S. PATENT DOCUMENTS

| | | | |
|---|---|---|---|
| 6,734,887 B2 | 5/2004 | Field | |
| 7,022,202 B2 | 4/2006 | Goertzen | |
| 7,503,495 B2 | 3/2009 | Schmitt et al. | |
| 7,530,491 B2 | 5/2009 | Lasch et al. | |
| 7,588,184 B2 | 9/2009 | Gandel et al. | |
| 8,186,582 B2 | 5/2012 | Varga et al. | |
| 8,360,312 B2 | 1/2013 | Varga et al. | |
| 8,523,062 B2 | 9/2013 | Varga et al. | |
| 8,725,589 B1* | 5/2014 | Skelding | G06Q 20/354 705/26.5 |
| 8,857,722 B2 | 10/2014 | Mosteller | |
| 8,944,810 B2 | 2/2015 | Herslow | |
| 9,053,470 B2 | 6/2015 | Boge et al. | |
| 9,058,547 B2 | 6/2015 | Oh et al. | |
| 9,070,053 B2 | 6/2015 | Mosteller | |
| 9,076,093 B2 | 7/2015 | Seo et al. | |
| 9,117,155 B2 | 8/2015 | Mosteller | |
| 9,430,724 B2 | 8/2016 | Mosteller | |
| 9,547,814 B2 | 1/2017 | Mosteller | |
| 9,569,718 B2 | 2/2017 | Herslow | |
| 9,684,860 B2 | 6/2017 | Zambrano | |
| 9,779,343 B2 | 10/2017 | Mosteller | |
| 9,836,684 B2 | 12/2017 | Finn et al. | |
| 10,032,099 B2 | 7/2018 | Mosteller | |
| 10,255,536 B2 | 4/2019 | Mosteller | |
| 2003/0062716 A1* | 4/2003 | Curiel | B42D 25/328 283/71 |
| 2004/0178624 A1* | 9/2004 | Kawasaki | G06K 19/041 283/74 |
| 2004/0217178 A1* | 11/2004 | Lasch | B42D 25/00 235/488 |
| 2006/0262366 A1 | 11/2006 | D'Amato et al. | |
| 2009/0200175 A1 | 8/2009 | Chang et al. | |
| 2009/0230195 A1 | 9/2009 | Lasch et al. | |
| 2009/0294543 A1* | 12/2009 | Varga | G06K 19/07745 235/492 |
| 2011/0198112 A1 | 8/2011 | Kim et al. | |
| 2013/0020000 A1* | 1/2013 | Carter | C21D 9/48 148/714 |
| 2014/0144993 A1 | 5/2014 | Seo et al. | |
| 2015/0115039 A1* | 4/2015 | Mosteller | G06K 19/022 235/488 |
| 2015/0339564 A1 | 11/2015 | Herslow et al. | |
| 2016/0232438 A1 | 8/2016 | Williams et al. | |
| 2017/0098151 A1 | 4/2017 | Herslow et al. | |
| 2017/0109622 A1* | 4/2017 | Cepress | G06K 19/07737 |
| 2017/0259609 A1 | 9/2017 | McGinn | |
| 2017/0316300 A1 | 11/2017 | Herslow et al. | |
| 2018/0068210 A1 | 3/2018 | Suthar | |
| 2018/0129927 A1 | 5/2018 | Herslow et al. | |
| 2018/0197062 A1 | 7/2018 | Herslow et al. | |
| 2018/0207903 A1 | 7/2018 | Lowe | |
| 2020/0104550 A1* | 4/2020 | Russell-Clarke | G06K 19/083 |

OTHER PUBLICATIONS

MakeItFrom.com, '5182 (AlMg4.5Mn0.4, A95182) Aluminum', 2009, retrieved via the Internet on Jan. 31, 2020 at <https://www.makeitfrom.com/materialproperties/5182-AlMg4.5Mn0.4-A95182-Aluminum>. 1 page.

Wikipedia. Aluminum Alloy', Jul. 29, 2016 (Jul. 29, 2016), retrieved via the Internet on Jan. 31, 2020 at <https://en.wikipedia.org/wiki/Aluminium_alloy>. 14 pages.

Wikipedia. 'Milling (machining)' 1972, entire document, retrieved via the Internet on Feb. 3, 2020 at <https://en.wikipedia.org/wiki/Milling_(machining)>. 21 pages.

Wikipedia, 'Security Hologram', 1987, retrieved via the Internet on Jan. 31, 2020 at <https://en.wikipedia.org/wiki/Security_hologram>. 4 pages.

Custom Metal Credit Cards Ad and Order Form, retrieved via the Internet on Mar. 6, 2018 at <https://metal-creditcard.com>. 9 pages.

Sublimation Printing, retrieved via the Internet on Mar. 6, 2018 at <https://www.alibaba.com/product-detail/Wholesale-Modern-Design-Blank-Sublimation-Metal_1511223145.html?spm=a2700.7724857/B.main07.90.50b0697dYW8tin>. 20 pages.

* cited by examiner

METALLIC TRANSACTION CARDS

CROSS-REFERENCE TO RELATED APPLICATIONS

This application claims priority to and the benefit of U.S. Provisional Application No. 62/778,987 filed Dec. 13, 2018, which is incorporated by reference herein in its entirety.

BACKGROUND

Transaction cards are prevalent throughout modern society. Transaction cards may include various cards, including debit cards, credit cards, identification cards, loyalty cards, membership cards, healthcare cards, security cards, etc. Transaction cards thus include various types of information, including identification information, demographic information, financial or account information. Transaction cards may store this information in a variety of ways, including via utilization of magnetic stripes, radio frequency identification chips, etc. Transaction cards may be customized. Thus, companies may customize transaction cards to include graphic images, designs, photographs, etc. In addition, transaction cards may have security features, such as a diffraction grating or holographic image. International standards exist and prescribe physical dimensions and other features of transaction cards. Transaction cards' physical dimensions, features, and embossing area are set forth in the International Standards Organization ("ISO") 7810 and others, such as ISO 7811.

Transaction card are commonly made from thermoplastic materials, such as polyvinyl chloride ("PVC") and polyethylene terephthalate ("PET"). More recently, transaction cards have been made from metals. These metallic transaction cards are stronger and more durable than those made from thermoplastic materials, and may withstand exposure to the elements, such as moisture or sunlight. However, these metallic transaction cards are more difficult and expensive to manufacture and may have exposed metallic portions that are visually unpleasing. Known methods for overcoming these shortcomings may result in metallic credit cards that are prohibitively expensive.

Therefore, a need exists for manufacturing aesthetically pleasing metallic transaction cards in a cost effective manner and from suitable low-cost metals. A further need exists for incorporating various transaction card features into these transaction cards.

SUMMARY

Embodiments here are directed towards transaction cards and method of making the same.

In some embodiments, a transaction card comprises: card body having a front face, a rear face, and a periphery extending between the front face and the rear face, the front face and the rear face being anodized, wherein a front peripheral edge extends around the card body where the front face meets the periphery, and a rear peripheral edge extends around the card body where the rear face meets the periphery; and wherein the front peripheral edge and the rear peripheral edge are non-square. In some of these embodiments, a magnetic stripe and/or a bar code may be arranged on either or both of the front face and the rear face. In addition to or instead of the magnetic stripe and/or bar code, a chip pocket may be formed into either or both of the front face and the rear face. The card body may be Aluminum. Where provided, the magnetic stripe may be adhered within a corresponding slot milled into the front or rear face. In some embodiments, an overlay is arranged on the front or rear face of the card body and in these embodiments, the magnetic stripe may be applied to the overlay, for example, at an exposed face of the overlay, or be integrally formed with the overlay. Also, a hologram may be arranged on the exposed face of the overlay or the hologram may be integral with the overlay. The periphery of the card body may define a rounded edge that extends between the front face and the rear face of the card body with a constant radius or with a non-uniform radius. Either or both of the front peripheral edge and/or the rear peripheral edge may be beveled edges. Either or both of the front peripheral edge and/or the rear peripheral edge may be double beveled edges. In some examples, one of the front peripheral edge and the rear peripheral edge is a beveled edge and the other one of the front peripheral edge and the rear peripheral edge is a double beveled edge. In some embodiments, a bar code is provided on the front and/or rear face of the card body in addition to, or instead of, the magnetic stripe. In some embodiments, an account number or similar type of personal information is provided on the front face and/or the rear face of the card body.

Also disclosed are methods of manufacturing one or more transaction cards. In some embodiments, the method comprises forming one or more card bodies each having a front face, a rear face, and a periphery extending there between; anodizing the card bodies; and providing a magnetic stripe on the rear face of the card body. In these embodiments, forming the card bodies may include stamping the card bodies and, in some of these embodiments, each card body may be milled after stamping to provide a non-square edge on each card body. In some embodiments, providing a magnetic stripe may include milling a corresponding slot on the rear face of the card body and adhering the magnetic stripe within the corresponding slot. In some embodiments, providing a magnetic stripe may include laminating an overlay on the rear face of the card body and, in these embodiments, the magnetic stripe may be integral with the overlay or be applied to an exposed face of the overlay. In some embodiments, a hologram may be integral with the overlay or may be applied to an exposed face of the overlay. In some examples, forming one or more card bodies includes milling the card bodies to provide the periphery of each card body with a non-square edge. In some examples, anodizing the card bodies includes sublimating an image on either or both fo the front face and the rear face of the card body. In some embodiments, the method further includes milling a chip pocket into the card body.

In other embodiments, the method comprises forming one or more card bodies each having a front face, a rear face, and a periphery extending there between; milling the periphery of one of the card bodies to provide the card body with a non-square edge; and anodizing the card bodies. In some embodiments, the step of forming the card bodies includes stamping the card bodies or milling the card bodies and, in the latter such embodiment, the step of milling one of the card bodies may be performed simultaneously with the step of milling the periphery such that each card body is formed with the non-square edge. In some examples, the method further includes the step of personalizing the card body with personal information and/or decorating the card body, for example, with graphics or images. In some such embodiments, the step of personalizing and/or decorating may include laser-etching indicia and, in these embodiments, such indicia may include account information, account numbers, or bar codes. In some embodiments, the method further includes the step of providing a magnetic stripe on the card body after anodizing. In such embodiments, providing the magnetic stripe on the card body may include milling a corresponding slot in the card body and then adhering the magnetic stripe therein, or such embodiments may include laminating an overlay on the card body, wherein the magnetic stripe may be integral with the overlay or subsequently applied to an exposed face of the overlay. A hologram may be applied to the exposed face of the overlay, or it may be integrally provided in the overlay. In embodiments, where the step of providing the magnetic stripe on the card body includes milling the corresponding slot in the card body and then adhering the magnetic stripe therein, the method may include the step of milling a chip pocket in the card body before, after, or simultaneously as the corresponding slot is milled.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to transaction cards and, more particularly, to the manufacture of metallic transaction cards.

Figure 1:
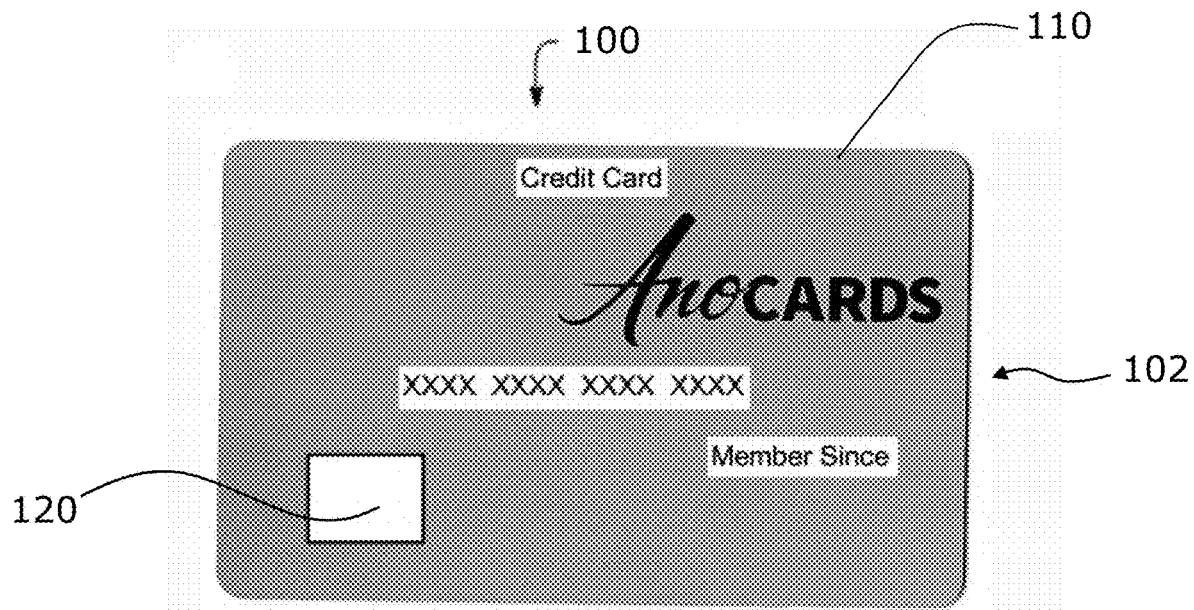
FIG. 1 is a front view of an exemplary transaction card that may incorporate the principles of the present disclosure.

Transaction cards and methods of making metallic transaction cards are disclosed herein. Transaction cards according to the examples disclosed herein have better mechanical properties than currently existing cards and have a more aesthetically pleasing appearance than such currently existing cards, and the presently disclosed methods of forming transaction cards with such improved mechanical and aesthetic properties result in significant cost savings as the presently disclosed transaction cards are significantly less expensive to manufacture (e.g., up to 75% less expensive). Transaction cards may include various types of cards, including luggage tags, identification cards, loyalty cards, gift cards, contact transaction cards (e.g., credit card having magnetic stripes, bar codes, and/or chips), and contactless transaction cards (e.g., credit cards having radio-frequency identification ("RFID") antenna chip). Depending on the ultimate end-use of the transaction card, it may include one or more information storing features and/or security features (hereinafter, collectively referred to as "features"). In one or more examples, the transaction cards disclosed herein FIG. 1 is a front view of an example transaction card 100 that may incorporate the principles of the present disclosure. The depicted transaction card 100 is just one example transaction card that can suitably incorporate the principles of the present disclosure. Indeed, many alternative designs and configurations of the transaction card 100 may be employed, without departing from the scope of this disclosure.

The transaction cards 100 disclosed herein may include a card body (or card form) 102. The card body 102 may be manufactured from various materials. As described below, the card body 102 may be made from Aluminum or other metals. In some embodiments, the transaction card 100 may also include one or more "overlays" (not illustrated) arranged on the card body 102. Thus, the transaction card 100 may be comprised of two (2) or more layers; though, in some embodiments the transaction card 100 includes the card body 102 without any overlays. Where utilized, overlays may be adhered to the card body 102 via adhesive or lamination. In some examples, the card body 102 is sandwiched between a front overlay and a rear overlay. In other embodiments, either a front overlay or a rear overlay is arranged on the card body 102. Overlays may be made from various materials, including without limitation, PVC or PET. In addition, overlays may integrally include various features or such features may be applied thereon, as detailed below.

The transaction card 100 includes a front face 110. As mentioned above, the transaction card 100 may include one or more front overlays and, in such embodiments, the front overlay(s) will define at least a portion of the front face 110. The front surface 110 of the transaction card 100 may include various features. In some examples, the features may include indicia, such as images, graphics, words, account numbers, or other symbols. As illustrated in FIG. 1, the indicia may be provided on the front face 110 of the transaction card 100, and it may be provided in a variety of techniques. For example, indicia may be printed on the front face 110 (or printed onto a front overlay applied on the front face 110) using conventional printing techniques, such as holographic printing, or the indicia may be laser etched or printed onto the card body 102 and/or the front overlay. In some embodiments, indicia is provided on an overlay that is adhered to the card body 102. Moreover, in embodiments where the transaction card 100 is a payment card (e.g., credit or debit card), the transaction card 100 may also include a chip-enabled card acceptance ("EMV") chip 120 that is exposed through a window in the front face 110. In even other non-illustrated embodiments, the transaction card 100 includes an RFID antenna chip (not illustrated) provided in the card body 102.

Figure 2:
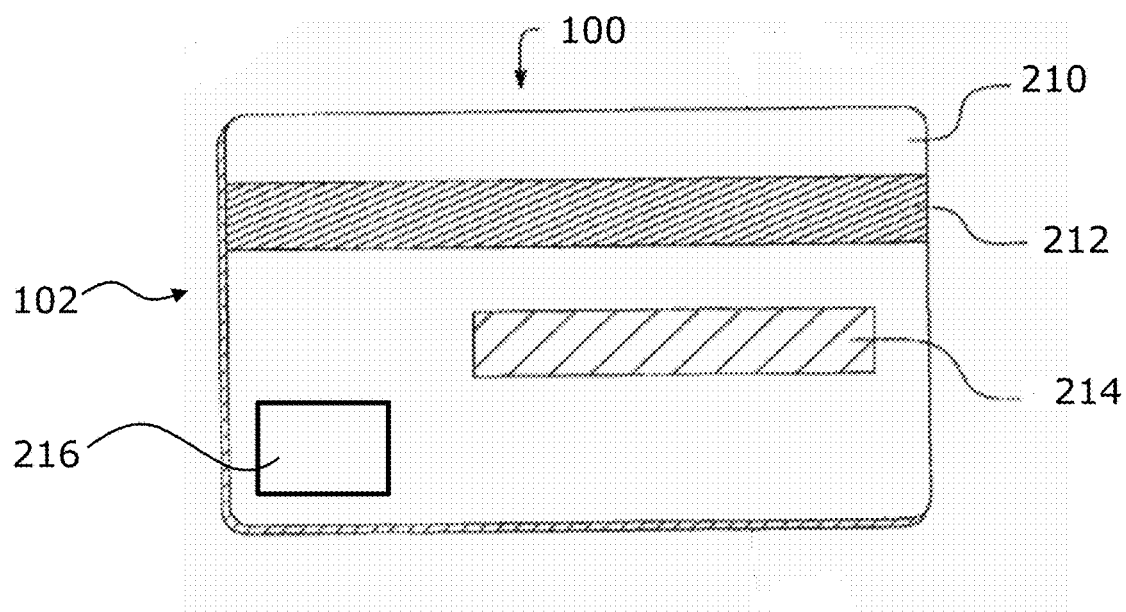
FIG. 2 is a back view of an exemplary transaction card in accordance with one or more embodiments of the present disclosure.

FIG. 2 illustrates an exemplary rear face 210 of the transaction card 100 of FIG. 1 that may incorporate the principles of the present disclosure. As mentioned above, the transaction card 100 may include one or more rear overlays and, in such embodiments, the rear overlay(s) will define at least a portion of the rear face 210. The rear face 210 may also include features. In the illustrated example, the rear face 210 includes a number of features, including a magnetic stripe 212, a signature panel 214, a hologram 216. Also in the illustrated example, the EMV chip 120 is installed within a pocket or recess (obscured from view) formed into the rear face 210 that is in communication with the window on the front face 110, and covered with a laminate such that the EMV chip 120 is obscured from view when viewing the rear face 210 as illustrated in FIG. 2. Thus, in the illustrated embodiment, the EMV chip 120 is embedded into the transaction card 100 and viewable only through the window formed in the front face 110. In even other examples, the transaction card 100 may include more or less features than those illustrated in FIGS. 1-2. For example, the transaction card 100 may be configured to include an RFID antenna chip (not illustrated) instead of or in addition to any of the other features described herein. Also, the transaction card 100 may also include a bar code on the front face 110 and/or the rear face 210, and such bar code may be provided in addition to any of the foregoing features or in lieu of any of the same, for example, it may be provided in addition to or instead of the magnetic stripe 212.

The foregoing features illustrated in FIGS. 1-2 (or other such features) may be attached to the transaction card 100 in a variety of techniques. As to the EMV chip 120, it may be adhered within a milled pocket as detailed below. As to the magnetic stripe 212, it may be adhered directly to the transaction card 100, for example, within a milled slot as detailed below. Alternatively, the magnetic stripe 212 may be topically applied. For example, the magnetic stripe 212 may be integrally included in a rear overlay that is laminated to the card body 102, such that the magnetic stripe 212 is laminated onto the card body 102, or an overlay may be laminated to the card body 102 and then the magnetic stripe 212 topically adhered to the overlay. The signature panel 214, where included, may also be topically applied to the transaction card 100 (in the same manner as described with regard to the magnetic stripe 212) via the same overlay as the magnetic stripe 212 or via a separate overlay. Similarly, the hologram 216, where included, may be topically applied to the transaction card 100 (in the same manner as described with regard to the magnetic stripe 212 and/or the signature panel 214) via the same overlay or via a separate overlay. Thus, for example, the magnetic stripe 212, the signature panel 214, and the hologram 216 (and other features) may all be integral with a single overlay (or topically adhered to a single overlay), or they may each be integral with their own separate overlay (or topically adhered to their own unique overlay), or any combination thereof. In other examples, at least two of the magnetic stripe 212, the signature panel 214, and the hologram 216 (and other features) are integrally included in the same overlay (or topically adhered to the same overlay) and the remaining feature(s) is (are) integrally included in a separate overlay (or topically adhered to a separate overlay). Thus, the features may be applied via a single laminated overlay or via two (2) or more separate laminated overlays.

The transaction cards 100 disclosed herein may be manufactured from various materials. Traditionally, transaction cards have been manufactured from thermoplastic materials such as PVC and/or PET, and these traditional transaction cards may be manufactured as laminates and thus include a plurality of layers. However, these thermoplastic transaction cards are susceptible to being damaged or destroyed if exposed to damaging environments. For example, moisture and/or sunlight may break down the chemical bonds within the polymers of such transaction cards, such that transaction cards left exposed to moisture and sunlight may become warped, cracked and unusable. In addition, thermoplastic transaction cards may be easily bent or may be broken or cut, thereby damaging the transaction card and rendering it unusable. Not only are these plastic transaction cards susceptible to damage and wear, but such plastic transaction cards having RFID antenna chips are more susceptible to fraud in the form of RFID antenna chip skimming. RFID antenna chip skimming is a type of fraud or theft where a criminal wirelessly (and remotely) excites the RFID antenna chip with energy from an RFID antenna chip reader device in order to obtain personal or financial information stored on another person's transaction card (e.g., a credit or debit card). Accordingly, the transaction cards 100 disclosed herein may be made from various metals or metal alloys.

In particular, the card body 102 may be made from various metallic materials, such as Aluminum, Tungsten, Steel, Titanium, etc. Transaction cards 100 made from such metallic materials are stronger and more durable than those made from thermoplastic materials. In addition, transaction cards 100 made from metals or metal alloys may inhibit skimming of sensitive data from the transaction card's RFID antenna chip. This is because the metal blocks or dissipates the RFID signals, thereby making it difficult to excite the chip from a distance without a high power transmitter. Moreover, RFID antenna chips in the transaction cards 100 disclosed herein may be grounded when installed within the transaction cards 100, which thereby impairs excitation of the RFID antenna chip by skimming devices which in turn inhibits skimming of the transaction card 100.

In some examples, the card body 102 of the transaction cards 100 is made from high tensile and yield strength Aluminum. For example, the transaction card 100 may be formed to have a minimum yield strength of at least about forty (40) kilo-pounds per square inch ("ksi"). Transaction cards 100 with this yield strength resist deformation after flexing, remaining flat. The transaction cards 100 may be provided with a lower minimum yield strength, however, without departing from the present disclosure. In addition, the transaction cards 100 may be provided with various maximum yield strength, where the maximum yield strength is dependent upon how much flex resistance of the card body 102 is desired or needed for a particular end use application. For example, the card body 102 may have a yield strength of below about seventy-three (73) ksi, such that it is not too brittle that it would break or fracture when in a user's wallet after repeated flexing. In several examples, the transaction card 100 is formed with a yield strength of between about forty (40) to sixty (60) ksi.

Various Aluminum alloys may be utilized to form the card body 102 with appropriate tensile and yield strengths, including but not limited to 5000 series, 6000 series, or 7000 series Aluminum.

For example, a 5000 series Aluminum may be utilized, including but not limited to AA 5056, AA 5052, AA 5182, etc. Where utilized, these or other 5000 series Aluminum alloys may be work-hardened during the rolling process. In addition, the 5000 series alloys may have various tempers, including but not limited to H18 temper designation, H19 temper designation, H26 temper designation, H34 temper designation, H39 temper designation, etc. In some examples, the card body 102 is formed from AA 5182 Hxx, and in some of these examples, the AA 5182 alloy has a temper designation of H18.

As mentioned, 6000 series Aluminum may be utilized. Various alloys in this series may be utilized, including but not limited to AA 6061 Aluminum. Where utilized, the 6000 series Aluminum may have various tempers, including but not limited to T4 temper designation or T6 temper designation. In one example, AA 6061-T6 Aluminum may be utilized. Aluminum AA 6061-T6 is high strength and heat-treated alloy, and may provide the card body 102 with a yield strength of about forty (40) to forty-two (42) ksi. This alloy is subject to thermal tempering to provide it with the requisite strength, which thereby makes it relatively expensive as compared to 5000 series Aluminum such as Aluminum AA 5182 Hxx. The Aluminum AA 6061-T6 alloy also includes Iron and Silicon, which provides it with a more "industrial" appearance that is not as bright or "clean" as compared to Aluminum AA 5182 Hxx. Depending on the particular end-use application of the transaction card 100, the "industrial" appearance may or may not be desirable. In examples where the card body 102 is formed from a 7000 series Aluminum alloy, various such alloys may be utilized, including but not limited to AA 7075, AA 7351, AA 7072, AA 7475, etc. Where utilized, the 7000 series Aluminum may have various tempers, including but not limited to T4 temper designation or T6 temper designation. In one example, AA 7075-T6 Aluminum is utilized and provides the transaction card 100 with a yield strength of about seventy-three (73) ksi.

As mentioned, 5000 series Aluminum may be utilized, including AA 5182 Hxx, AA 5052 Hxx, AA 5056 Hxx, etc. Aluminum AA 5182 Hxx is a wrought alloy with good corrosion resistance and favorable weldability characteristics. Instead of being subject to heat treatment, this alloy is work hardened (e.g., in either in the rolling or forming operations) to achieve the appropriate tensile properties. Thus, utilizing work hardened (or cold hardened) Aluminum AA 5182 Hxx may provide the transaction card 100 with high tensile strength and yield strength without heat treatment. In one example, Aluminum AA 5182 H18 is rolled to high minimum yield strength of about fifty (50) ksi, which provides the transaction card 100 with the appropriate tensile properties needed to prevent it from bending when stored in a wallet. In addition, Aluminum AA 5182 Hxx is abundant in supply and significantly less expensive than Aluminum AA 6061 because, unlike the latter, the former is not subject to heat treatment. Moreover, Aluminum AA 5182 Hxx has better aesthetic properties (i.e., gloss level and smooth finish) as compared to Aluminum AA 6061. For example, AA 5182 has a brighter mill finish before anodizing such that less polishing is subsequently needed and is brighter in anodizing than the AA 6061 Aluminum. Thus, manufacturing the transaction card 100 with Aluminum AA 5182 Hxx may be more economical to produce and provide the transaction card 100 with a brighter and "cleaner" finish, as compared to transaction cards produced from 6061 Aluminum.

The transaction cards 100 disclosed herein may have various geometries and dimensions, as may be required of a particular end-use application. In some embodiments, the transaction cards 100 disclosed herein conform to the dimensions set forth in ISO 7810. Thus, the thickness of the transaction cards 100 may be in the range of 0.027 inches to 0.033 inches thick. This range of thicknesses will ensure that the transaction cards 100 fit through card reader devices (not illustrated), and will also ensure that the information stored on the transaction card 100 (e.g., information stored in the magnetic stripe 212, EMV chip 120, etc.) is readable by the card reader devices. In some embodiments, transaction cards 100 disclosed herein are provided with thickness at the upper end of the foregoing range of thicknesses, for example, 0.030 to 0.033 inches. The transaction cards 100 having thicknesses within this upper range of thicknesses will have as much mass possible while still being able to pass through a card reading device, therefore making them suitable as premium edition transaction cards (e.g., high-limit credit cards, luxury hotel loyalty cards, etc.). In other embodiments, transaction cards 100 provided herein may include thicknesses and/or one or more other dimensions that are different from those provided in ISO 7810.

The card body 102 of the transaction card 100 may be formed via a variety manufacturing techniques. For example, the card bodies 102 may be formed via a stamping process or via a machining (e.g., milling) process. As detailed below, stamping may be utilized to form more than one of the card bodies 102 simultaneously, whereas milling may be utilized to form one of the card bodies 102 at a time. With regard to stamping, a coil of material may be provided and then stamped into blanks that do not have the edge characteristics described below. Because forming the transaction cards 100 via this process does not simultaneously provide the card bodies 102 with edge characteristics as detailed below, this forming process may be utilized, for example, where the transaction card 100 is to be utilized in less high-end or lower quality products such as luggage tags or other promotional cards. Alternatively, a coil of material may be cut or slit into slit coils (or mults), after which the mults are flattened and then cut into sheets, and then milled into the form of the card body 102. This latter formation process may provide the card bodies 102 with the edge characteristics as detailed below and my thus be utilized to form transaction cards 100 needed in high quality end use applications, as the milling step may simultaneously provide the card body 102 with a desirable edge characteristic simultaneously as it is cut from the sheet.

As mentioned, the transaction cards 100 may be manufactured via stamping, for example, where one or more of the card bodies 102 are stamped from a coil of material using a hard-tooled stamping/blanking press. When formed by stamping, however, the card bodies 102 may have a square (or ninety degree (90°)) edge extending along a periphery thereof. These square edges may include burrs or other sharp, jagged or rough surfaces, which may be undesirable for a particular end-use application. Therefore, the square edges may be machined after stamping (i.e., finishing) to remove burrs or other sharp, jagged or rough surfaces. For example, a cutting tool may be utilized to machine the square edges of the card body 102 and remove such burrs or other sharp, jagged or rough surfaces. In some embodiments, the cutting tool is configured to machine a non-square edge into the card body 102, as described below. Thus, cutting tools may be utilized to de-burr the square edges of the card body 102 and, in some embodiments, the cutting tools are configured to also machine the square edges into non-square edges. While finishing the square edges in this manner to remove burrs involves an additional operation, it may nevertheless be desirable in end-use applications where burrs are undesirable, for example, where the transaction card 100 is to be frequently handled by the end-user. In addition, finishing the square edges into non-square edges may inhibit delamination of the transaction cards 100 in embodiments, for example, where one or more overlays are laminated on the card body 102. Moreover, where the transaction cards 100 are manufactured with metallic materials, the square edge may reveal a metallic color of the card body 102, which may be visually unappealing and difficult to conceal via subsequent processing.

Alternatively, the transaction cards 100 disclosed herein may be manufactured via milling, for example, where the card bodies 102 are individually machined to size from a sheet. Various types of milling equipment may be utilized to mill the transaction cards 100, such as a computer numerical controlled ("CNC") precision mill. Also, various cutting tools may be utilized to mill the card body 102. In some examples, the cutting tools are configured to cut a square edge in the card body 102; whereas, in other embodiments, the cutting tools are configured to cut a non-square edge. As mentioned above, the card bodies 102 formed via stamping may be subsequently finished, and any of these cutting tools utilized to mill the card bodies 102 from blanks of material may be utilized to finish the edges of the transaction cards 100 that have been stamped to remove burrs and/or to form non-square edges.

As used herein, the term non-square edges means edges that are not ninety degrees (90°). For example, non-square edges may include a rounded edge (e.g., a full radius edge or a double radius edge), a beveled edge (e.g., a double beveled edge, a triple beveled edge, etc.), or other edges that are not 90°. Providing the transaction cards 100 with such non-square edges (sometimes referred to as "edging"), regardless of whether the card body 102 thereof was milled or stamped, may yield an aesthetically appealing edge or periphery that is not sharp to the touch and, therefore, will not cut an end-user or wallet. Not only are the non-square edges aesthetically pleasing (as compared to square edges), but the non-square edges of the card body 102 may be colored (e.g., via sublimation) to cover-up or hide the metallic color of the card body 102 from the end-user. And, where the card body 102 is to be anodized only, but not subject to sublimation, the non-square edges of the card body 102 are colored in the same dyestuff as the other areas of the card body 102 through dye absorption.

Figure 3:
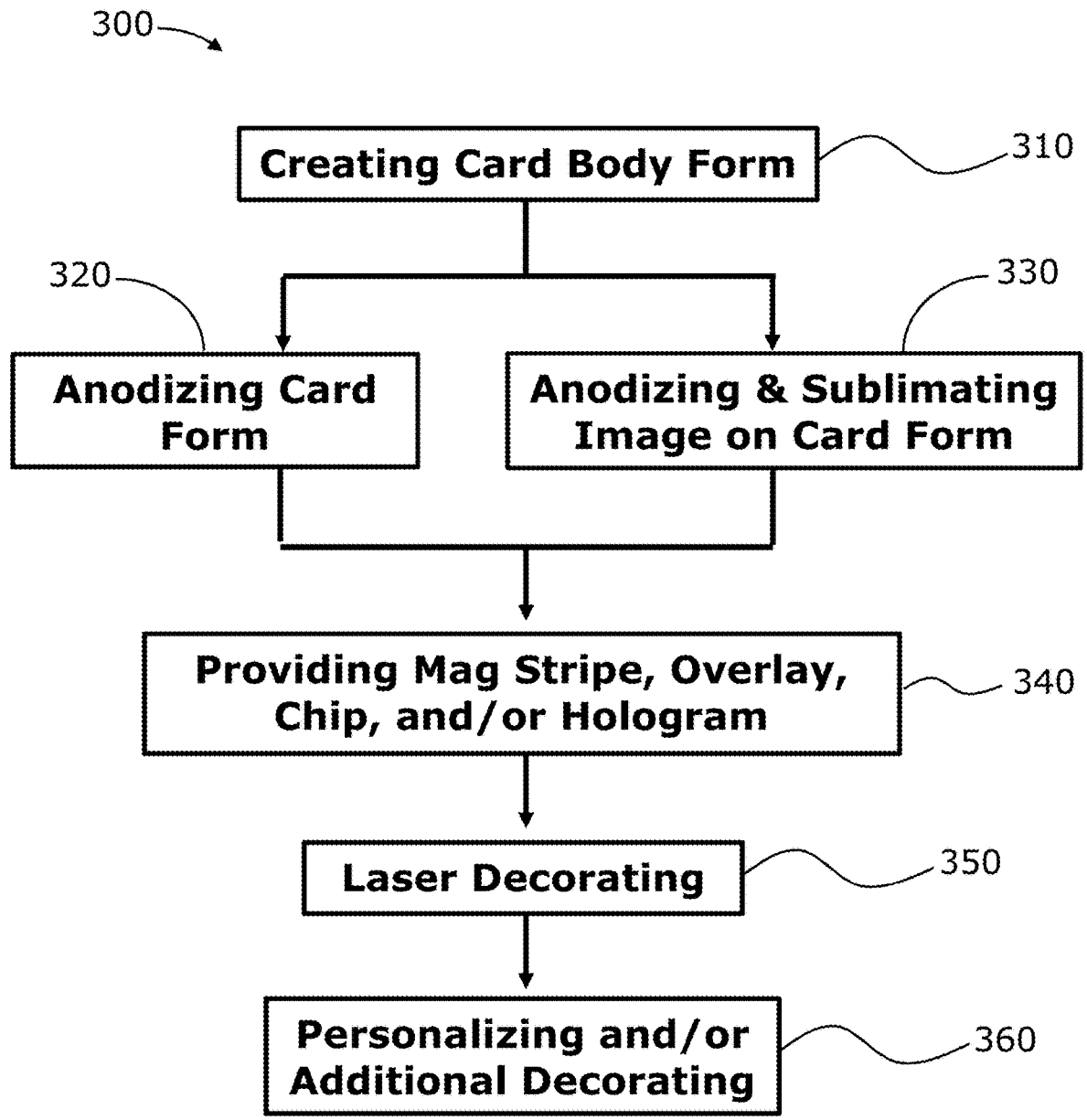
FIG. 3 is an exemplary process for manufacturing a transaction card, according to one or more embodiments.

FIG. 3 illustrates a process 300 for manufacturing one or more of the transaction cards 100, according to one or more embodiments of the present disclosure. As illustrated, the process 300 includes various steps, one or more of which may be optional. Thus, FIG. 3 illustrates just one example of the process 300 and, in other examples, the various steps of the process 300 may be performed in a different sequence or skipped, without departing from the present disclosure. In the illustrated embodiment, the process 300 includes the following steps: (1) creating card body form 310; (2) either (a) anodizing card body 320 or (b) anodizing and sublimating image on card body 330; (3) providing the magnetic stripe, overlay, chip, and/or hologram 340; (4) laser decorating 350; and (5) personalizing and/or additional decorating 360. As mentioned, some the foregoing steps are optional and, depending on the particular end-use application, may be skipped and/or performed in a different order. For example, the laser decorating 350 step and/or the personalizing and/or additional decorating 360 step may be skipped. Additionally, some the foregoing steps may include one or more sub-steps, and some of these sub-steps may be skipped depending on the particular end-use application. For example, in the providing mag stripe, overlay, chip, and/or hologram 340 step, the sub-step of installing the EMV chip 120 may be skipped.

The creating card body form 310 step may include various manufacturing or forming processes. As described above, different manufacturing methods may be utilized to form the card body 102. For example, the card bodies 102 may be formed via stamping or milling; however, other manufacturing techniques may be utilized without departing from the present disclosure. Thus, the creating card body form 310 step may include milling the card body 102 with either square edges and/or non-square edges. Alternatively, the creating card body form 310 step may include stamping one (1) or more of the card bodies 102 and, optionally, an additional sub-step of either deburring the square edges or machining non-square edges into the card bodies 102 (which may also serve to deburr the edges). Where the card bodies 102 are formed via milling, the card body 102 may be cut from the sheet or coil via a cutting tool that is configured to form a non-square edge along the periphery of the card body 102 as it is cut from the sheet via a single pass of the cutting tool. However, as mentioned above, milling the periphery of the card body 102 after stamping, whether to remove burrs and/or to form non-square edges, is an additional sub-step to be performed following stamping.

After creating the card body form 310, the card body 102 may be placed on a rack or other device for subsequent processing. In one example, the card bodies 102 are placed on an anodizing rack (not illustrated) and transported to an anodization line for subsequent processing as detailed below.

Once transported to the anodization line, the card bodies 102 are anodized via the anodizing card body 320 step. However, where an image is to be provided on the transaction cards 100, the card bodies 102 instead undergo the anodizing and sublimating image on card body 330 step, where the card bodies 102 are anodized and then the image is provided thereon via sublimation printing. Thus, the anodizing and sublimating image on card body 330 step may include both an anodizing sub-step and an imaging or sublimation-printing sub-step.

Regardless of whether an image is to be sublimation-printed, the card body 100 may be cleaned first. Thus, the anodizing sub-step of both the anodizing card body 320 step and the anodizing and sublimating image on card body 330 step may include a cleaning operation. In some examples, the card body 102 is cleaned via Phosphoric Acid, however, other cleaning solutions may be utilized, for example, alkaline detergent formulations, inorganic acid or alkaline formations, organic acid formulations, $CO_2$ (i.e., dry ice), or $H_2O_2$, plasma cleaning. Then, the card body 102 may be polished, and polishing may be performed through a mechanical process (e.g., buffing), a chemical process (e.g., bright dipping), or an electrochemical process (e.g., electro-polishing), or combinations thereof. Thus, the anodizing sub-step of both the anodizing card body 320 step and the anodizing and sublimating image on card body 330 step may include a polishing operation. In examples where polishing is accomplished via the chemical process, the card body 102 may be bright dipped in a polishing formulation. Then, a recovery operation may be performed to capture dissolved Aluminum from the Phosphoric Acid previously utilized to rinse the card body 102 during the cleaning operation and/or the polishing operations. Here, used Phosphoric Acid may be recovered through counter-flow rinsing, where it is recycled via ion exchange and vacuum evaporation. Thus, the anodizing sub-step of both the anodizing card body 320 step and the anodizing and sublimating image on card body 330 step may include a recovery operation. Then, a deoxidation operation may be performed on the card body 102, where the card body 102 is placed in an acid bath at room temperature to oxidize and remove metal precipitates that may have formed during the preceding polishing operation when the card body 102 was subject to bright-dipping or electro-polishing. Acid baths having various oxidation chemistries or formulas may be utilized in the deoxidation operation.

After the deoxidation operation, the card body 102 may be anodized, wherein such anodization operation forms an oxide layer on the card body 102. The oxide layer may have various thicknesses and, in some embodiments, the oxide layer may range in thickness from seven (7) to twenty-five (25) microns. In even other examples, the oxide layer may have a thickness ranging from ten (10) to twenty-five (25) microns, or even twelve (12) to twenty-five (25) microns. In some of these examples, the oxide layer ranges in thickness from fourteen (14) to twenty-five (25) microns. However, the oxide layer may have other thicknesses without departing from the present disclosure. Thus, the anodizing sub-step of both the anodizing card body 320 step and the anodizing and sublimating image on card body 330 step include an anodizing operation.

The card body 102 may be rinsed after anodization. Thus, the anodizing sub-step of both the anodizing card body 320 step and the anodizing and sublimating image on card body 330 step may include a rinsing operation to clean out the anodic pores previously formed on the card body 102. In one example, the card body 102 is subject to a standing rinse for three (3) minutes in a room temperature solution. Various solutions may be utilized for this standing rinse.

At this point of the process 300, the anodizing and sublimating image on card body 330 step diverges from the anodizing card body 320 step, as the former includes an imaging sub-step in addition to the anodizing sub-step.

Where no image is to be sublimated onto the transaction card 100, the anodizing card body 320 step may then include a dying operation. Here, the card body 102 is dyed utilizing various anodizing dyestuffs. Then, the anodizing card body 320 step may include a pre-sealing operation where the card body 102 is pre-sealed, for example, by dipping it in a tank containing Nickel Acetate for about three (3) to six (6) minutes. However, the card body 102 may be dipped in tanks containing other metals or non-metals. After the pre-seal operation, the anodizing card body 320 step may include a final sealing operation, where the card body 102 is further sealed, for example, by dipping it in a tank of deionized water for about three (3) to ten (10) minutes. Thereafter, the anodizing card body 320 step may include a drying operation. Here, the card body 102 is dried with forced air at a temperature ranging from about 220 degrees Fahrenheit (220° F.) to 275 degrees Fahrenheit (275° F.) and then removed from the anodizing line; however, different parameters may be utilized to dry the card body 102.

However, where an image is to be provided on the transaction card 100 via sublimation technology, the card body 102 will instead undergo the anodizing and sublimating image on card body 330 step that includes an imaging sub-step. In the anodizing and sublimating image on card body 330 step, the dying operation and the pre-sealing operation may be skipped. Instead, immediately after the standing rinse operation, the anodizing and sublimating image on card body 330 step may include a rinsing operation where, for example, a standing rinse of deionized water is performed on the card body 102. Then, the anodizing and sublimating image on card body 330 step may include a drying operation where, for example, the card body 102 is dried with forced air at a temperature ranging from about 220° F.) to 275° F. However, other parameters may be utilized for the drying operation.

After drying, the card body 102 is moved from the anodizing line to an imaging line where the card body 102 is subject to an imaging operation. Thus, the anodizing and sublimating image on card body 330 step includes an imaging operation. In the imaging operation, sublimation printing paper (hereinafter, "paper") is placed in a printer and an image is printed on the paper. The paper having the printed image (hereinafter, "printed paper") may then be cut to size and register holes may be formed therein, for example, via laser cutting. In other examples, the printed paper is mechanically cut to size and punched with register holes.

Thereafter, the image is transferred to the card body 102 via a sublimation-printing operation. Here, the printed paper, together with any fixture cards, are arranged on the top and/or bottom face of the card body 102. Then, the stack (i.e., card body 102 with the printed paper and fixture cards) is pressed in a sublimation press. In some embodiments, several of the card bodies 102 are arranged in a pattern (e.g., a grid) when pressed within the sublimation press. The image (on the printed paper) is then sublimated into a respective face of the card body 102 by pressing at a temperature of 400° F. for forty-five (45) seconds; however, other sublimation printing parameters may be utilized.

Then, the anodizing and sublimating image on card body 330 step may include a pre-seal operation where the card body 102 is pre-sealed, for example, by dipping it in a tank containing Nickel Acetate for about three (3) to six (6) minutes. After the pre-seal operation, the anodizing and sublimating image on card body 330 step may include a final sealing sub-step. Here, for example, the card body 102 is sealed by dipping it in a tank containing deionized water for about three (3) to ten (10) minutes; however, other parameters may be utilized. Thereafter, the anodizing and sublimating image on card body 330 step may include a drying operation, where the card body 102 is dried with forced air, for example, at a temperature ranging from about 220° F. to 275° F. However, other parameters may be utilized. Thus, the sealing and drying operations following sublimation may be performed in the same manner as the sealing and drying operations after dying without sublimation, as previously described.

At this point in the process 300, the anodizing card body 320 and the anodizing and sublimating image on card body 330 steps are complete, and the providing mag stripe, overlay, chip, and/or hologram 340 step may be performed to apply or install the various information storing features and/or security features (i.e., the features). As detailed herein, this step may include milling the card body 102 and/or laminating the card body 102. Thus, the providing mag stripe, overlay, chip, and/or hologram 340 step may include various sub-steps or operations depending upon which features are to be provided on the transaction card 100 and the manner in which they are to be installed or applied. However, where the transaction card 100 is to be utilized in a particular end-use application where no such features are needed by the end-user, this step may be skipped or by-passed; or, where the end-user intends to install any such features after the transaction card 100 has been made via the process 300, this step may be subsequently performed.

In some embodiments, the providing mag stripe, overlay, chip, and/or hologram 340 step includes laminating an overlay on the card body 102. The overlay 102 may include one or more features integral therewith, or such features may be topically applied to the overlay after the overlay has been applied to the card body 102. The overlays may be laminated to the card body 102 via a variety of laminating processes. For example, the card body 102 may be arranged in a planishing press with one or more preregistered overlays arranged on the front face and/or the rear face of the card body 102, and then pressed together within the planishing press.

Next, the laser decorating 350 step may be performed to decorate the transaction card 100, as illustrated in FIG. 3. Here, various information may be applied by laser, for example a card number, a name, brand information, or other information, etc. Also, the laser may be utilized to provide various decoration, for example, where the transaction card 100 is to be used as a loyalty card or gift card. The foregoing information and/or decoration may be provided on the front face 110 and/or the rear face 210, or the laser decorating 350 step may be skipped all together. In some examples, the laser decorating 350 step is utilized to personalize the transaction card 100 with information such as account information or numbers, etc. Utilizing lasers to decorate and/or personalize the transaction cards 100 as described herein may be beneficial in that it may provide a three-dimensional surface finish that has a tactile sensation in many circumstances. Also, laser decorating may be performed before the card body 102 is anodized, for example, immediately after creating the card body form 310. For example, the surface of the card may be disrupted with a laser such that the surface of the card has a tactile sensation, which may be beneficial for displaying a logo on the transaction card 100.

Then, the transaction card 100 may be subject to the personalization and/or additional decorating 360 step. For example, drop on demand printing may be utilized to personalize and/or decorate the transaction card 100. As previously mentioned, the transaction card 100 may be decorated at various other times during the process 300, for example, before or after anodizing. In addition, various decorating techniques may be utilized to decorate the transaction card 100, for example, screen printing, hot stamping, gravure printing, etc.

Figure 4:
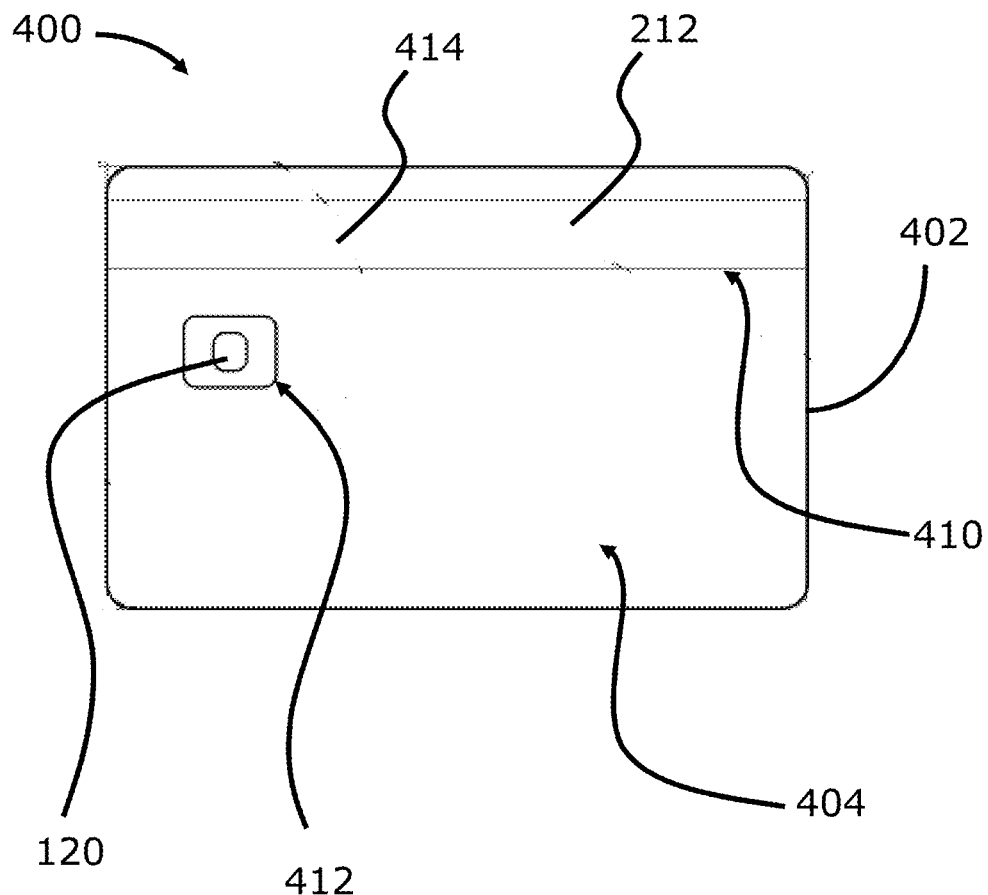
FIG. 4 is a rear view of a transaction card manufactured according to the process of FIG. 3.
Figure 5:
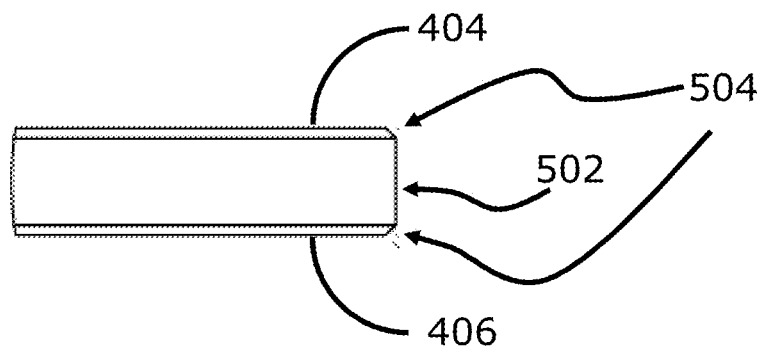
FIG. 5 is a side view of the transaction card of FIG. 4.
Figure 6:
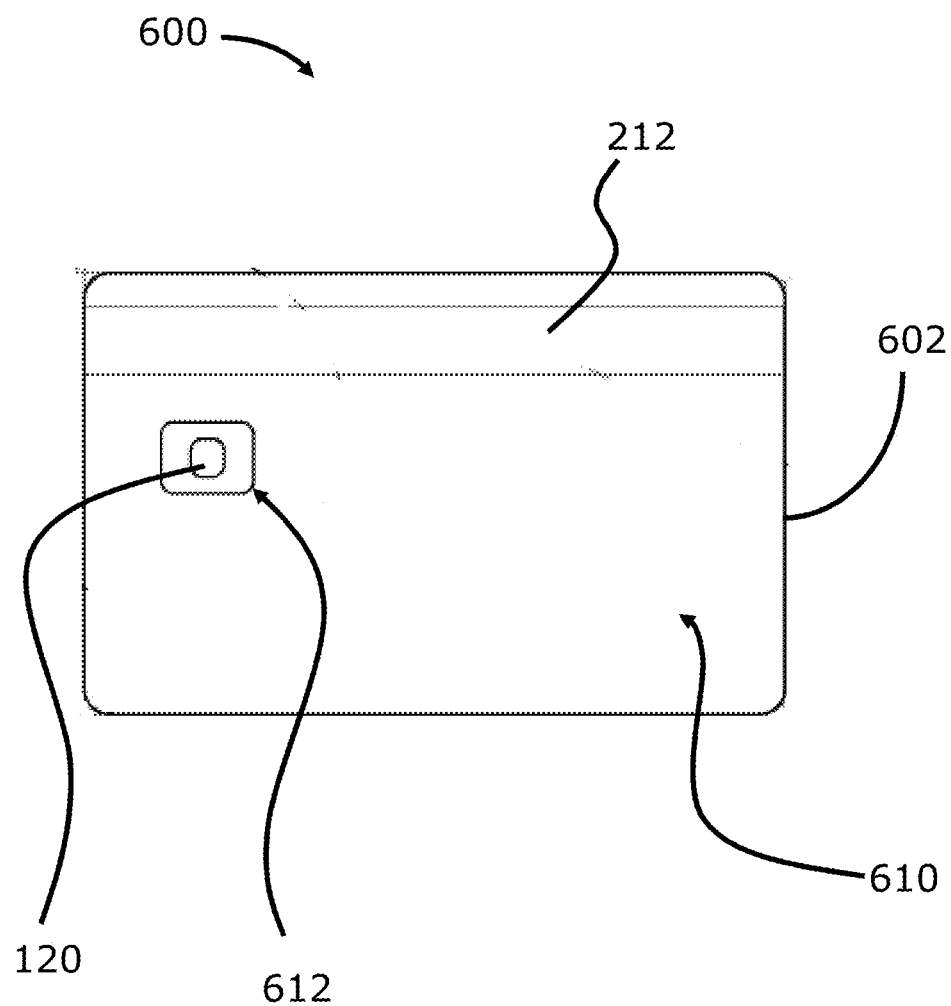
FIG. 6 is a rear view of an alternate transaction card manufactured according to the process of FIG. 3.
Figure 7:
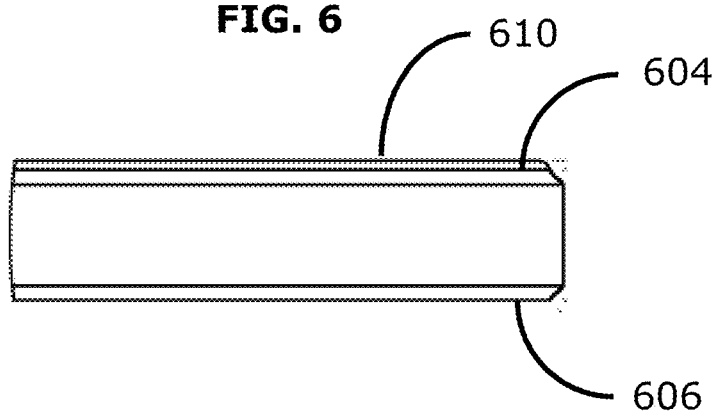
FIG. 7 is a side view of the transaction card of FIG. 6.

FIGS. 4-5 illustrate an exemplary transaction card 400 manufactured via the process 300, according to one or more embodiments. FIG. 6-7 illustrate another exemplary transaction card 600 manufactured via the process 300, according to one or more alternate embodiments. The transaction cards 400,600 include card bodies 402,602 and, as discussed below, the card bodies 402,602 are subject to various operations during the providing mag stripe, overlay, chip, and/or hologram 340 step.

With regard to the transaction card 400 illustrated in FIGS. 4-5, FIG. 4 illustrates a rear face 404 of the transaction card 400. Here, the card body 402 is anodized such that the rear face 404 thereof includes an oxide layer. FIG. 5 illustrates a partial side view of the transaction card 400 of FIG. 4 and shows how the rear face 404 (and a front face 406) of the card body 402 may include the oxide layer. FIG. 5 also illustrates how a periphery 502 of the card body 402 may be machined with a non-square geometry 504, as discussed above.

Continuing with FIGS. 4-5, a mag stripe slot 410 and a chip pocket 412 are milled into the rear face 404 of the card body 402 during the providing mag stripe, overlay, chip, and/or hologram 340 step. Here, the mag stripe slot 410 is milled first, but it may instead be milled after milling of the chip pocket 412. The magnetic stripe 212 may be installed within the mag stripe slot 410 after milling the mag stripe slot 410. In the illustrated example, an overlay 414 that integrally includes the magnetic stripe 212 is laminated into the mag stripe slot 410. However, in other examples, an overlay (that does not integrally include the magnetic stripe 212) may be laminated in the mag stripe slot 410 after milling the mag stripe slot 410 and/or milling the chip pocket 412 and then the magnetic stripe 212 may be adhered to that overlay. In even other embodiments, the magnetic stripe 212 is adhered directly (i.e., without an overlay) within the mag stripe slot 410 with an adhesive. The EMV chip 120 may be installed in the chip pocket 412 at this time (before or after), or the chip pocket 412 may remain empty for subsequent installation by an end-user. In addition, the hologram 216 (not illustrated) may be applied to the card body 402 before or after installation of the magnetic stripe 212. In some examples, an overlay is laminated to the card body 402 and then the hologram is applied thereto; whereas, in other embodiments, the hologram is integral with an overlay that is laminated to the card body 402. The hologram 216 may be installed before or after the magnetic stripe 212.

With regard to the transaction card 600 illustrated in FIGS. 6-7, the card body 602 thereof includes a rear face 604 and a front face 606, and an overlay 610 may be laminated on the card body 602 during the providing mag stripe, overlay, chip, and/or hologram 340 step. FIG. 7 is a partial side view of the transaction card 600 of FIG. 6, and illustrates an embodiment where the overlay 610 is laminated on the rear face 604 of the card body 602. However, in other examples the overlay 610 may instead be laminated on the front face 606, or the overlay 610 may be laminated on both the rear face 604 and the front face 606. The overlay 610 may be a PVC backing or a PET backing, and it may or may not include features as detailed above. In addition, more than one overlay may be utilized to cover the entirety of the rear face 604 (and/or the front face 606) of to cover less than the entirety thereof.

Continuing with FIGS. 6-7, a chip pocket 612 is then milled into the rear face 604 of the card body 602. In this embodiment, the overlay 610 is a layer that substantially covers the entirety of the rear face 604 of the card body 602 such that at least a portion of the overlay 610 is cut when milling the chip pocket 612. However, in other embodiments, the overlay 610 may be provided on less than the entirety the card body 602 (such as on one or more portions thereof) such that it need not (but may) be milled through when forming the chip pocket 612 or other recesses.

In this embodiment, a mag stripe slot is not milled in the card body 602. Rather, the magnetic stripe 212 may be topically applied to the overlay 610 via an adhesive. In other embodiments, however, the magnetic stripe 212 is integral with the overlay 610 such that the magnetic stripe 212 is applied to the card body 602 during lamination of the overlay 610 on the card body 602; and in these examples, the overlay 610 may also include other features, such as the hologram 216. After installing the magnetic stripe 212, the EMV chip 120 may be installed, or it may be installed later in the process 300 or by the end-user. Thereafter, the hologram 216 may be applied to the overlay 610, for example, via roll-on hot stamping; however, as mentioned above, in some examples the hologram 216 may be integral with the overlay 610 and applied to the card body 602 when laminating the overlay 610.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A transaction card, comprising:
a metallic card body having a front face, a rear face, and a peripheral surface extending between the front face and the rear face, the front face and the rear face being anodized; and
a magnetic stripe or a bar code integrally contained within an overlay, wherein the overlay is arranged on the anodized rear face;
wherein a front beveled peripheral surface is formed in the metallic card body where the front face meets the peripheral surface, and a rear beveled peripheral surface is formed in the metallic card body where the rear face meets the peripheral surface; wherein the front and rear beveled peripheral surfaces extend about the periphery of the metallic card body; and wherein the front and rear beveled peripheral surfaces are colored to cover a metallic color of the card body.

2. The transaction card of claim 1, wherein the metallic card body comprises an Aluminum alloy selected from the group consisting of AA 5182 Hxx, AA 5056 Hxx, AA 5052 Hxx, AA 6061 T4, and AA 6061 T6.

3. The transaction card of claim 2, wherein the Aluminum alloy is AA 5182 having a temper designation selected from the group consisting of H18, H19, H26, H34, and H39.

4. The transaction card of claim 1, wherein a hologram is arranged on an exposed face of the overlay.

5. The transaction card of claim 1, wherein a hologram is integral with the overlay.

6. The transaction card of claim 1, wherein the front beveled peripheral surface and the rear beveled peripheral surface are each double beveled surfaces.

7. The transaction card of claim 1, further comprising a chip pocket milled into the front face of the metallic card body and a chip provided within the chip pocket.

8. The transaction card of claim 1, wherein an account number is provided on the front face and/or the rear face of the metallic card body.

9. The transaction card of claim 1, wherein the peripheral surface and the front and rear beveled peripheral surfaces are anodized with the front face and the rear face.

10. The transaction card of claim 1, further comprising laser engravings on the overlay.

11. A method of manufacturing one or more transaction cards, comprising:
milling one or more metallic card bodies each having a front face, a rear face, a periphery extending there between, a front beveled peripheral surface along a front edge of the metallic card body between the front face and the periphery, and a rear beveled peripheral surface along a rear edge of the metallic card body between the front face and the periphery;
anodizing the metallic card bodies wherein the peripheral surface and the front and rear beveled peripheral surfaces are anodized with the front face and the rear face to cover a metallic color of the card body;
providing an overlay on the anodized rear face of the metallic card body, wherein the overlay includes a magnetic stripe integrally embedded within the overlay; and
laser-etching indicia onto an exposed rear surface of the overlay.

12. The method of claim 11, wherein the overlay includes a hologram integrally embedded within the overlay.

13. The method of claim 11, wherein anodizing the metallic card bodies includes sublimating an image on either or both of the front face and the rear face of the metallic card body.

14. The method of claim 11, wherein milling one or more metallic card bodies includes milling a chip pocket in an interior portion of the card body.

15. The method of claim 11, wherein anodizing the metallic card bodies includes sublimating an image on either or both of the front face and the rear face of the metallic card body and wherein the front and rear beveled peripheral surfaces are colored during sublimating to cover a metallic color of the card body.

16. A method of manufacturing one or more transaction cards, comprising:
forming one or more metallic card bodies each having a front face, a rear face, and a periphery extending there between;
milling one of the metallic card bodies to form both a front beveled peripheral surface along a front edge of the metallic card body between the front face and the periphery and a rear beveled peripheral surface along a rear edge of the metallic card body between the front face and the periphery;
anodizing the metallic card bodies, wherein the front and rear beveled peripheral surfaces are colored during anodizing in the same dyestuff as the other areas of the card body though dye absorption to cover a metallic color of the card body; and
providing an overlay on the anodized rear face of the metallic card body, wherein the overlay includes a magnetic stripe integrally embedded within the overlay.

17. The method of claim 16, wherein forming one or more metallic card bodies includes stamping the one or more card bodies from a metal sheet material.

18. The method of claim 17, wherein anodizing the metallic card body comprises anodizing the metal sheet material before stamping the card bodies from the metal sheet material.

19. The method of claim 16, wherein forming one or more metallic card bodies includes milling one of the metallic card bodies simultaneously with the step of milling the periphery such that each card body is formed with the front and rear beveled peripheral surfaces.

20. The method of claim 16, further including the step of personalizing and/or decorating the metallic card body, wherein the step of personalizing and/or decorating the metallic card body includes laser-etching indicia onto the front face and/or the rear face of the metallic card body.

* * * * *